United States Patent Office

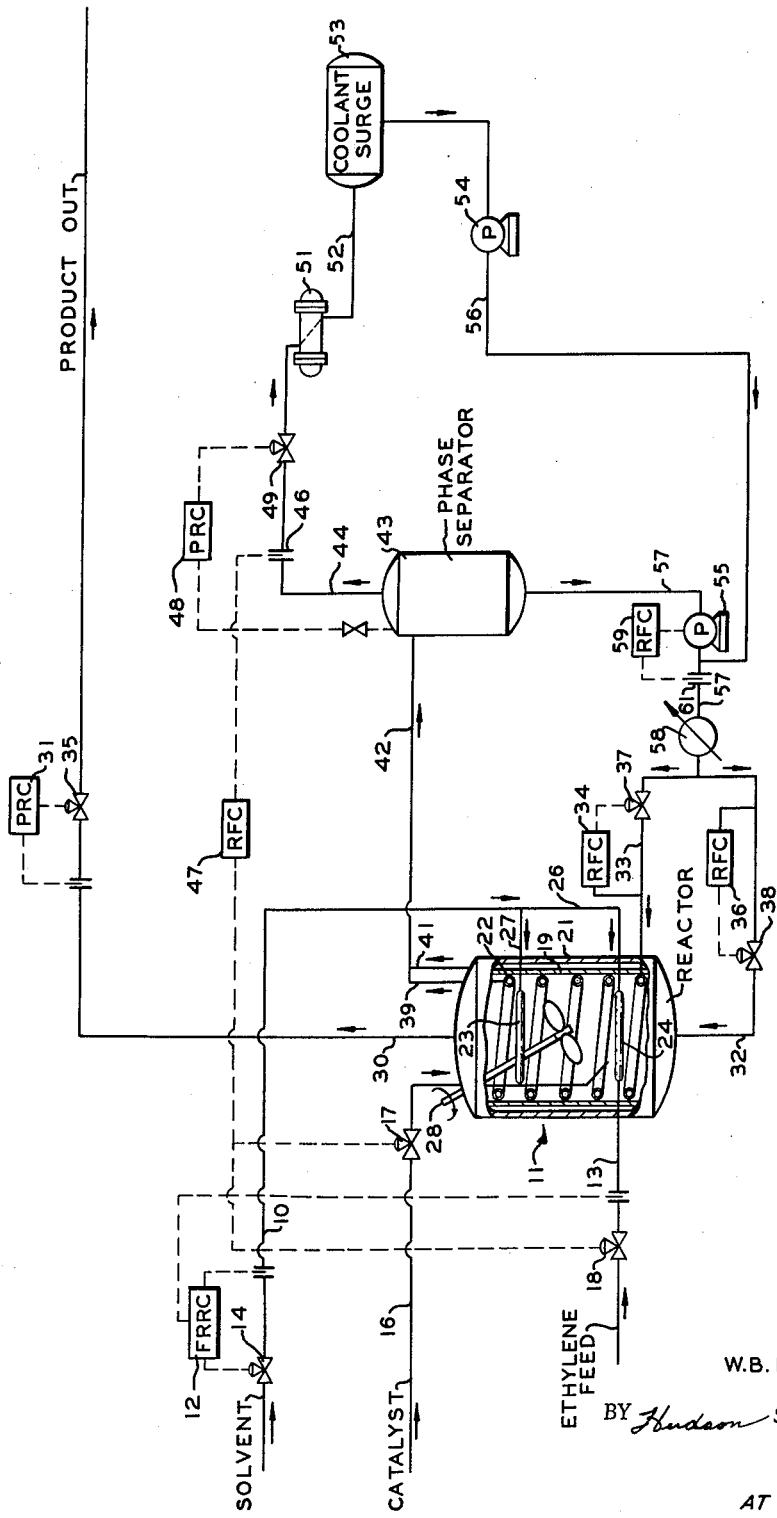

3,074,920
Patented Jan. 22, 1963

3,074,920
CONTROL OF POLYMERIZATION REACTIONS
William B. Henderson, Decatur, Ala., assignor to Phillips Petroleum Company, a corporation of Delaware
Filed Dec. 6, 1956, Ser. No. 626,706
10 Claims. (Cl. 260—94.9)

This invention relates to the control of polymerization reactions. In one aspect, it relates to a method for controlling the reaction rate in a polymerization process. In another aspect, it relates to a method for controlling the rate of addition of reactant materials to a polymerization zone. In a further aspect, it relates to a system for controlling a polymerization process.

Various methods are described in the literature for producing normally solid and semisolid polymers. For example, hydrocarbons, such as ethylene, propylene, isobutene, butadiene, and styrene can be polymerized, either independently or in various admixtures with one another, to produce solid or semisolid polymers. Recently, considerable attention has been directed toward the production of solid olefin polymers, such as polymers of ethylene and/or propylene. The polymerizations are frequently carried out in the presence of a solid catalyst, utilizing a liquid solvent as the reaction medium. The polymerization reactions are exothermic so that it becomes necessary to provide for the removal of heat liberated by the reaction. The removal of the heat of reaction is frequently accomplished by employing a reactor system provided with an indirect heat exchange means through which a suitable coolant is circulated. One of the problems arising when using such a system relates to the control of the polymerization reaction rate so that a uniform product having desired properties may be obtained.

It is an object of this invention to provide an improved method for controlling polymerization reactions.

Another object of the invention is to provide means for controlling polymerization reactions.

Still another object of the invention is to provide a method for controlling the concentration of reactant materials in a polymerization process.

A further object of the invention is to provide a polymerization process whereby a polymer product having uniform properties is produced.

Other and further objects and advantages of the invention will become apparent to one skilled in the art upon consideration of the accompanying disclosure and the drawing which is a flow diagram illustrating a preferred embodiment of the invention.

As mentioned previously, an indirect heat exchange means is often employed to remove the heat of reaction from polymerization processes. While the polymerization reaction temperature can be controlled by adjusting the circulation rate of the coolant, such an adjustment is not always entirely satisfactory, for it fails to take into account the concentration of reactant materials present in the reaction zone. Thus, it may become impossible or at least impracticable to control the reaction temperature merely by adjusting the coolant circulation rate. For example, the reaction temperature may change so rapidly as a result of changes in other process variables that it becomes impossible to supply coolant at a sufficient rate to maintain the reaction temperature desired. As a result, the reaction rate will fluctuate during conduct of the process, thereby rendering it difficult to obtain a polymer product of uniform properties. In accordance with the instant invention, a method of control is provided which takes into consideration the concentration of reactant materials in the reaction zone so that it is possible at all times to maintain control over the polymerization reaction rate and thereby obtain a uniform polymer product.

Broadly speaking, the instant invention resides in an improved method for controlling the rate at which one of the reactant materials, monomer and catalyst, is introduced into a polymerization zone. The method comprises measuring the volume of coolant vapors evaporated as a result of a coolant being passed in indirect heat exchange with the reaction mixture in the polymerization zone and thereafter adjusting the rate of introduction of one of the reactant materials so as to maintain a desired coolant evaporation rate.

In one embodiment, in a process which comprises charging a slurry of polymerization catalyst in a solvent and a polymerizable hydrocarbon to a reaction zone at a constant desired rate, and circulating a coolant, maintained at a constant pressure, through the reaction zone at a constant rate in indirect heat exchange with the reaction mixture therein so as to maintain a substantially constant reaction temperature, the invention resides in the improvement which comprises measuring the volume of coolant vapors evaporated as a result of the aforementioned indirect heat exchange and adjusting the rate of introduction of said catalyst slurry or polymerizable hydrocarbon so as to maintain a predetermined coolant evaporation rate. In a more specific embodiment of the invention, the coolant circulated through the reaction zone is at its boiling point temperature, and the heat removed from the reaction zone is that required to vaporize the coolant.

The present invention is broadly applicable to polymerization processes in general, and more particularly to processes in which an olefin is contacted with a catalyst in suspension in a solvent. However, the invention is especially applicable for use in the production of polymers obtained according to the copending U.S. patent application of Hogan and Banks, Serial No. 476,306, filed December 20, 1954, and now abandoned. As set forth in this application in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. The amount of chromium, as chromium oxide, in the catalyst can range from 0.1 to 10 or more weight percent. Although chromium contents as high as 50 weight percent are operative, amounts above 10 weight percent appear to have little added advantage for the polymerization of ethylene. However, for the polymerization of propylene and higher boiling olefins, chromium contents as high as 25 or 30 percent are often advantageous. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., for example, with a stream of a substantially anhydrous oxygen-containing gas, such as air. The olefin feed used for the polymerization is at least one olefin selected from the class of 1-olefins having a maximum of 8 carbon atoms per molecule and no branching nearer the double bond than the 4-position. Examples of such olefins are ethylene, propylene, 1-butene, 1-pentene, and 1,3-butadiene. Copolymers, such as ethylene-propylene copolymers and ethylene-butadiene copolymers, can be prepared by the described method. The polymerization can be effected at a temperature in the range 150 to 450° F. The pressure can range from approximately atmospheric to as high as 1000 p.s.i.

A satisfactory method of conducting the polymerization as disclosed in the above cited patent application comprises contacting an olefin with a slurry of catalyst in a hydrocarbon solvent which can exist as a liquid at the temperature of polymerization. In such a case, the reaction pressure need only be sufficient to maintain the solvent substantially in the liquid phase, and will ordinarily range from about 100 to about 700 p.s.i. The instant invention is particularly applicable to this type of operation, i.e., one in which an olefin is contacted with a catalyst slurry. When utilizing the control method of this invention with this type of process, it has been found to be desirable to operate at a temperature such that the polymer is substantially all in solution in the hydrocarbon solvent. This temperature will vary according to the particular solvent which is utilized, e.g., with paraffins between about 250 and 450° F., and with naphthenes between 230 and 450° F. However, it is to be understood that the method can be used with processes carried out at temperatures such that the polymer produced is in undissolved solid form.

Suitable solvents for use in the above described process are hydrocarbons which are liquid and chemically inert under the reaction conditions. Solvents which can be advantageously used include paraffins, such as those having from 3 to 12, preferably from 7 to 9, carbon atoms per molecule, for example, 2,2,4-trimethylpentane (isooctane), normal hexane, normal decane, isopentane, and the like. Another class of solvents which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. A preferred subclass of naphthenic hydrocarbons within the above defined general class is constituted by those naphthenic hydrocarbons having from 5 to 6 carbon atoms in a single ring and from 0 to 2 methyl groups as the only substituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

Referring now to the drawing, there is shown a flow diagram which illustrates diagrammatically a preferred embodiment of the instant invention. While the invention is described with relation to a particular polymerization process, it is to be understood that it is not intended to so limit the invention. Thus, the invention is applicable to any polymerization process in which the material to be polymerized and catalyst are continuously supplied to a polymerization reaction zone. However, the invention is particularly applicable to a process in which a polymerizable hydrocarbon, such as an olefin, is contacted with a catalyst suspended in a solvent.

As shown in the drawing, a suitable solvent, such as cyclohexane, enters the system through inlet line 10. The rate of solvent introduction into reactor 11 is controlled by means of ratio flow recorder-controller 12 which is operatively connected to orifices in lines 10 and 13 and to motor valve 14 contained in line 10. This recorder-controller and the control instruments referred to hereinafter are of a type well known in the art which are adapted to transmit a signal, such as a pneumatic signal, to a flow control means, such as a motor valve, which is thereby actuated so as to maintain a desired rate of flow of material. Inlet line 13 provides means for introducing a feed material, such as ethylene, into the system. Since ratio flow recorder-controller 12 is operatively connected to both the solvent and ethylene lines, it operates by varying the amount of solvent introduction through adjustment of motor valve 14 so as to control the ratio of the amount of solvent to ethylene charged to the reactor. When controlling the process by adjusting the catalyst feed rate, as discussed hereinafter, the ratio is usually adjusted so that the reaction mixture is saturated or nearly saturated with ethylene. In the embodiment of the invention in which the process is controlled by adjusting the rate of introduction of ethylene, the rate of solvent introduction is taken off ratio flow control and placed on rate of flow control so that a constant rate of flow of solvent is maintained. This aspect of the invention is also discussed hereinafter in more detail.

A catalyst, which preferably has a particle size in the range of about 40 to about 100 mesh, is charged to the reactor through line 16. The catalyst is generally added to the reactor in the form of a slurry in the solvent. The catalyst can be, for example, a chromium oxide-silica-alumina catalyst prepared by impregnating a 90 weight percent silica and 10 weight percent alumina gel composite with chromium trioxide, drying, and heating in air to obtain a catalyst composition containing approximately 2.5 weight percent chromium in the form of chromium oxide of which approximately half is in the form of hexavalent chromium. A polymerizable hydrocarbon, such as ethylene, as previously mentioned, enters the system through inlet line 13. Lines 13 and 16 contain flow control means, such as motor valves 17 and 18, which will be discussed more in detail hereinafter.

Reactor 11 comprises a reaction vessel 19 surrounded by a jacket 21 so as to provide a space therebetween through which coolant can be circulated. Disposed within reaction vessel 19 is a coil of heat exchange tubes 22 which in conjunction with the jacket surrounding the reaction vessel provide means for removing heat from the vessel during the polymerization. Perforated distribution members 23 and 24, which are positioned in the upper and lower portions of the reaction vessel, provide means for introducing ethylene and solvent into the reaction vessel. Solvent inlet line 10 is connected to each of the distribution members by means of lines 26 and 27 while feed inlet line 13 is attached to lower distribution member 24. A suitable stirring means 28 is disposed in the reaction vessel to facilitate good contact between the reactant materials and to maintain the catalyst in suspension in the reaction mixture. The reaction vessel can be maintained, for example at 275° F. and 500 p.s.i. with the reaction time ranging from about 15 minutes to about 10 hours. The reactor effluent, which is withdrawn through line 30, comprises a mixture of polymer, solvent, suspended catalyst, and small amounts of unreacted ethylene. A pressure recorder-controller 31, which is operatively connected to an orifice in line 30 and to a flow control means, such as motor valve 35, in the same line, provides means for maintaining a desired pressure in the reactor system.

The reaction mixture contained in reaction vessel 19 is maintained at the desired reaction temperature by circulating a coolant through heat exchange coils 22 and through the space between the reaction vessel and jacket 21. As a coolant, it is preferred to utilize the same material which is employed as a solvent in the polymerization reaction. By using the same type of material, no separation problem susbsequently arises because of any leakage of coolant into the reaction vessel. The coolant is introduced into the space between reaction vessel 19 and jacket 21 through line 32 and into cooling coils 22 through line 33. The coolant is circulated through the coil and jacket at a constant rate and enters the reactor at a constant temperature. The rate at which the coolant is introduced into the reactor is controlled by means of rate of flow controllers 34 and 36, which are operatively connected to motor valves 37 and 38. The coolant is preferably at its boiling point temperature on entering the reactor system in which case the heat removed from the reaction zone is that required to vaporize the coolant. It is to be understood, however, that the coolant on entering the reactor can be at a temperature below its boiling point so that heat required to raise the coolant to its boiling point is also removed from the reaction zone. In any case, it is necessary for the practice of the instant invention that the coolant in circulating through the reactor be raised to its boiling point and that at least some vaporization of the coolant occurs.

As previously discussed, at least a portion of the coolant is evaporated in circulating through the reactor, thereby removing heat from the reaction mixture. The amount of heat removed from the reaction mixture in this manner depends upon the actual coolant employed and the rate at which the coolant is circulated through the reactor. The coolant circulated through heat exchange coils 22 is withdrawn therefrom through line 39 while the coolant circulated through the space between the reaction vessel and the jacket is recovered through line 41. Thereafter, the recovered coolant stream comprising liquid coolant and coolant vapors is passed by means of line 42 into phase separation vessel 43. The liquid coolant collects in the bottom of the phase separator while the coolant vapors are taken overhead through line 44. Line 44 contains an orifice 46 which is operatively connected to rate of flow controller 47 which is further connected to valve 17 in catalyst inlet line 16 and valve 18 in feed inlet line 13. Rate of flow controller 47 in conjunction with orifice 46 provides means for measuring the volume of vapors passing through line 44, and for thereafter adjusting one or the other of valves 17 and 18 in accordance with this measurement. Pressure recorder-controller 48, operatively connected to a flow control means, such as motor valve 49, in line 44 and to phase separator 43, provides means for maintaining a constant pressure in the cooling system.

When a coolant is introduced into a reactor at a constant rate and at a constant temperature, as described hereinbefore, it has been found that the amount of coolant which is evaporated in its circulation through the reactor is a direct indication of the polymerization reaction rate. Thus, when all reaction variables are constant, a definite determinable amount of vapors passes through orifice 46 in line 44. However, if a change in one of the process variables occurs, such as a change in catalyst activity, there occurs a change in the polymerization reaction rate which is immediately evidenced by a change in the amount of coolant which is evaporated. More specifically, if the catalyst activity should decrease during the polymerization, the reaction temperature also falls off with the result that less of the coolant is evaporated. In accordance with this invention, the change in the amount of coolant evaporated is immediately detected, and the concentration of reactant materials introduced into the reaction vessel is adjusted according to this change. It is generally preferred to vary the rate at which catalyst is supplied to the reactor; therefore, rate of flow controller 47 operates to increase the opening of valve 17 in line 16 so as to allow additional catalyst to enter the reaction vessel. It is to be understood that when the catalyst introduction rate is being controlled in this manner, rate of flow controller 47 is not operatively connected to valve 18 in ethylene feed line. The ethylene feed rate in this case is maintained at a desired constant rate by means of another rate of flow controller (not shown) which can be operatively connected to motor valve 18. As a result of the increased catalyst concentration, the reaction rate increases and the reaction temperature rises until the quantity of vapors passing through orifice 46 reaches a predetermined original value. When there is an increase in the amount of coolant evaporated, flow controller 47 operates through valve 17 to cut back on the catalyst feed rate.

While it is preferred, as indicated, to adjust the catalyst feed rate, it is also within the scope of the invention to control the polymerization reaction by adjustment of the ethylene feed rate. When polymerizing ethylene and controlling the process by adjustment of the catalyst feed rate, it is the usual practice to operate so that the reaction mixture is saturated or nearly saturated with ethylene. Ratio flow recorder-controller 12 controls the rate of solvent introduction so as to maintain such a reaction mixture. If the polymerization process is controlled by varying the ethylene feed rate, ethylene is charged to the reaction vessel at a rate such that the ethylene concentration in the reaction mixture is at some point below saturation, e.g. 90 to 99 percent saturation. To obtain such a reaction mixture, the solvent is taken off ratio flow control, and the solvent and ethylene are charged to the reactor at constant predetermined rates. By maintaining the ethylene concentration at some point below saturation, it becomes possible to vary the amount of ethylene charged to the reactor in accordance with the amount of evaporated coolant so as to control the reaction rate. The actual steps in controlling the process by varying the ethylene feed rate are very similar to those followed when the catalyst feed rate is employed. Thus, when there is a decrease in the amount of coolant evaporated thereby indicating a drop in reaction rate, rate of flow controller 47 functions to increase the opening of valve 18 and thereby allow additional ethylene to enter the reaction vessel. When operating in this manner, it is to be realized that rate of flow controller 47 is not operatively connected to valve 17 in the catalyst feed line. The catalyst feed rate in this embodiment is maintained at a desired constant rate by means of an additional rate of flow controller (not shown) which can be operatively connected to valve 17. As a result of this increase in the concentration of ethylene in the reaction mixture, the reaction rate is also caused to increase until the amount of coolant evaporated returns to its original predetermined value. Any increase in the amount of coolant evaporated above its original predetermined value is detected by the rate of flow controller which then operates through valve 18 to cut back on the ethylene feed rate.

After passing through valve 49 in line 44, the coolant vapors enter condenser 51 wherein they are condensed. Liquid coolant recovered from condenser 51 is passed by means of line 52 into coolant surge tank 53. The coolant, which is pumped from the surge tank by means of pump 54, is then passed by means of line 56 to line 57 wherein it is mixed with liquid coolant recovered from phase separator 43. Liquid coolant recovered from phase separator 43 is withdrawn at a rate dependent upon the pumping rate of pump 55. Rate of flow controller 59, operatively connected to orifice 61 and to pump 55, provides means for controlling the rate at which coolant is supplied to the reactor and subsequently circulated through the heat exchange means associated therewith. Prior to passage into the reactor through lines 32 and 33 as hereinbefore discussed, the liquid coolant passes through heat exchange means 58 which provides means for regulating the temperature at which the coolant enters the reactor. As mentioned above, it is generally preferred to control the temperature of the coolant so that it enters the reactor at its boiling point. It is within the purview of the invention to employ a temperature recorder-controller in conjunction with the heat exchanger, which automatically adjusts the temperature of the coolant stream so that it enters the reactor at the desired temperature.

It is to be realized that over a period of time the cooling efficiency, i.e., the heat transfer coefficient, of the cooling surfaces may decrease. This decrease in efficiency is generally caused by the formation of a coating of polymer on the cooling surfaces. After prolonged periods of operation, it may even become necessary to take the reactor off stream in order to clean out the polymer. When the cooling surfaces become coated with polymer, there will necessarily be less heat removed from the reactor with the result that there will be a tendency for the reaction temperature to rise. This, of course, assumes that the rate of circulation and temperature of the coolant are constant as discussed hereinbefore. Thus, it is seen that it becomes necessary in a plant operation to compensate for the effect of decreased cooling efficiency of the cooling surfaces. This can be readily accomplished by periodically measuring the reaction temperature and thereafter manually adjusting the coolant circulation rate so that the desired reaction temperature is obtained. When such changes in circulation rate are made, it also becomes necessary to recalibrate rate of flow controller 47, i.e., change its index setting, in order to take account of the fact that an increased amount of vapors will be evaporated at the new increased circulation rate.

A more complete understanding of the invention can be obtained by referring to the following illustrative example which is not intended, however, to be unduly limitative of the invention.

*Example*

Ethylene is polymerized utilizing a reactor system similar to that illustrated in the drawing. The polymerization is carried out in the presence of a 60 mesh catalyst prepared by impregnating a 90 weight percent silica-10 weight percent alumina coprecipitated gel composite with an aqueous solution of chromium trioxide, drying, and heating for several hours in a stream of anhydrous air at about 950° F. The polymerization is conducted by contacting the ethylene with the catalyst in the form of a slurry in cyclohexane. Cyclohexane is also employed as the coolant in the polymerization reaction.

A slurry of the above-described catalyst in cyclohexane is charged to the reactor at the rate of 34.8 pounds of catalyst and 311.3 pounds of cyclohexane per hour. An ethylene feed stream containing 95 percent ethylene is injected into the reactor at the rate of 1456 pounds per hour. The solvent cyclohexane is introduced into the reactor at the rate of 8859 pounds per hour. The pressure within the reactor is 500 p.s.i.a. while the reaction temperature is maintained at 285° F. by circulating cyclohexane in indirect heat exchange with the reaction mixture. The coolant cyclohexane, which is at a temperature of 285° F. and a pressure of 40 p.s.i., is circulated through the reactor at the rate of 50,300 pounds per hour. The residence time of the reactant materials in the reactor is 2½ hours. The reactor effluent, which is recovered from the reactor, is then passed to suitable means for separating polymer, cyclohexane, catalyst and unreacted ethylene. In this separation, 828 pounds of polymer per hour are recovered.

The coolant cyclohexane in circulating through the reactor removes heat from the reaction mixture as the result of evaporation of the cyclohexane. A coolant stream containing liquid and vaporous cyclohexane is then passed into a phase separator. The liquid cyclohexane settles to the bottom of the phase separator while the cyclohexane vapors are taken overhead and passed through an orifice at the measured rate of 17,150 cubic feet per hour. Thereafter, the vapors are passed into a condenser wherein they are condensed. The liquid cyclohexane is passed from the condenser into a coolant surge tank. Liquid cyclohexane recovered from the coolant surge tank and the phase separator is then passed into the reactor for circulation through the indirect heat exchange means as previously described. Prior to introduction of the coolant into the reactor, it is passed through a heat exchanger wherein its temperature is adjusted so that it enters the reactor at 285° F. The rate at which the coolant is introduced into the reactor is also controlled so that it is charged to the reactor at the rate of 50,300 pounds per hour.

During operation of the process as described hereinabove, the rate of evaporation of the cyclohexane in the cooling coils decreases because of a decrease in catalyst activity. As a result of this decrease in catalyst activity, the reaction rate and the reaction temperature decrease so that 16,350 cubic feet of cyclohexane per hour is evaporated in its passage through the reactor. This decrease in the amount of cyclohexane which is vaporized is immediately detected by the rate of flow controller operatively connected to the above-mentioned orifice in the overhead vapor line from the phase separator. A pneumatic signal proportional to the decrease in the amount of cyclohexane evaporated is transmitted from the rate of flow controller to a motor valve contained in the catalyst inlet line. The motor valve is thereby actuated causing catalyst to enter the reactor at a new rate of 35.6 pounds per hour. Because of this increase in catalyst feed rate, the reaction rate and concomitantly the reaction temperature are also increased. With this increase in the reaction temperature, an increased amount of cyclohexane is evaporated, the increase being detected by the rate of flow controller. When cyclohexane vapors are evaporated at the rate of 17,150 cubic feet per hour, the rate of flow controller functions so as to return the motor valve in the catalyst inlet line to its original position. Thereafter, the polymerization proceeds at the desired operating conditions with close control over the reaction rate being continuously maintained by varying the concentration of catalyst in the reaction zone as described hereinbefore. It is to be understood that instead of controlling the polymerization by varying the concentration of catalyst in the reaction mixture, the rate at which ethylene is supplied to the reaction zone can be varied in accordance with the measured amount of cyclohexane vapors evaporated during circulation of coolant through the reactor. However, when employing the rate of ethylene introduction to control the process, it is necessary to operate with an amount of ethylene in the reaction mixture somewhere below the saturation point, e.g., from 90 to 99 percent saturation. Since it is usually preferred to carry out the polymerization with the reaction mixture being saturated with ethylene, the polymerization is generally controlled by varying the concentration of catalyst rather than the ethylene feed rate.

As mentioned hereinbefore, the control instruments utilized in the practice of the instant invention can be commercially available items of manufacture. For example, in Bulletin 450 of the Foxboro Company, Foxboro, Mass., instruments are illustrated and described which can be suitably employed. Thus, the ratio flow recorder-controller, the rate of flow controllers, and the pressure recorder-controllers of this invention can be, respectively, a Model 40 Ratio Controller, a Model 40 Indicating Controller, and a Model 40 Controller as shown on pages 55, 62, and 52 of the aforementioned Foxboro Bulletin.

From the foregoing, it is seen that a novel method has been provided for controlling the reaction rate in a polymerization process. By maintaining close control over the reaction conditions so that they may remain substantially constant during practice of the process, it is possible to obtain a polymer product which has desirable uniform properties. It will be apparent to those skilled in the art that variations and modifications of the invention can be made from a study of the foregoing disclosure. Such variations and modifications are believed to be clearly within the spirit and scope of the invention.

I claim:

1. In a process which comprises charging a slurry of polymerization catalyst in a solvent and a polymerizable hydrocarbon to a reaction zone, and circulating a coolant, maintained at a constant pressure, through said reaction zone in indirect heat exchange with reaction mixture therein so as to maintain a substantially constant reaction temperature, the improvement which comprises measuring the volume of coolant evaporated as a result of said indirect heat exchange; and adjusting the rate of introduction of one of said catalyst and polymerizable hydrocarbon, so as to maintain a predetermined coolant evaporation rate.

2. The process of claim 1 wherein said coolant is at its boiling temperature.

3. A method for controlling the rate at which one of the materials, monomer and catalyst, is introduced into a polymerization zone, said method comprising measuring the volume of vapors evaporated as a result of a coolant being passed in indirect heat exchange with reaction mixture in said polymerization zone; and adjusting the rate of introduction of one of said materials so as to obtain a predetermined constant evaporation rate.

4. A process for polymerizing a polymerizable hydrocarbon which comprises continuously introducing a polymerization catalyst into a polymerization zone; continuously charging a polymerizable hydrocarbon and a solvent into said zone; circulating a coolant in indirect heat exchange with reaction mixture in said reaction zone, said coolant being at about its boiling point and at a constant pressure; recovering an effluent stream containing polymer product from said reaction zone; withdrawing a coolant stream comprising liquid and vaporous coolant from said reaction zone; separating coolant vapors from said coolant stream; measuring the flow rate of coolant vapors separated from said coolant stream; and adjusting the rate of introduction into said reaction zone of one of said materials, catalyst and polymerizable hydrocarbon, so that said coolant is vaporized at a predetermined rate.

5. The process of claim 4 in which said catalyst is a polymerization catalyst comprising chromium oxide.

6. In a process wherein ethylene is polymerized in a reaction zone in admixture with at least one hydrocarbon selected from the group consisting of normally liquid paraffins and naphthenes in the presence of a polymerization catalyst comprising chromium oxide, at a temperature in the range of about 150 to 450° F. and a pressure sufficient to maintain the reaction mixture in the liquid phase, the improvement which comprises continuously introducing said ethylene, hydrocarbon, and catalyst into said reaction zone at predetermined rates; circulating a coolant at a constant rate in indirect heat exchange with reaction mixture in said reaction zone, said coolant being at about its boiling point and at a substantially constant pressure, so as to maintain a predetermined temperature in said reaction zone; recovering an effluent stream containing polymer product from said reaction zone; withdrawing a coolant stream comprising liquid and vaporous coolant from said reaction zone; separating coolant vapors from said coolant stream; measuring the flow rate of coolant vapors separated from said coolant stream; increasing the rate at which said catalyst is introduced into said reaction zone when said flow rate of coolant vapors is less than a predetermined value; and decreasing the rate at which said catalyst is introduced into said reaction zone when said flow rate of coolant vapors is greater than a predetermined value.

7. In a polymerization reactor system comprising a closed reaction vessel, means for introducing catalyst into said reaction vessel, means for introducing solvent into said reaction vessel, means for introducing feed material into said reaction vessel, indirect heat exchange means associated with said reaction vessel, coolant inlet means attached to said indirect heat exchange means and coolant outlet means attached to said indirect heat exchange means, the improvement comprising means for measuring the rate of flow of coolant vapors recovered from said indirect heat exchange means through said coolant outlet means; first flow control means in said catalyst introduction means; second flow control means in said feed material introduction means; and rate of flow control means operatively connected to said measuring means and one of said first and second flow control means.

8. The reactor system of claim 7 in which said measuring means is an orifice in communication with said coolant outlet means, said first flow control means is a first motor valve, said second flow control means is a second motor valve, and said rate of flow control means is a rate of flow controller operatively connected to one of said first and second motor valves.

9. In a process wherein ethylene is polymerized in a reaction zone in admixture with at least one hydrocarbon selected from the group consisting of normally liquid paraffins and naphthenes in the presence of a polymerization catalyst comprising chromium oxide, at a temperature in the range of about 150 to 450° F. and a pressure sufficient to maintain the reaction mixture in the liquid phase, the improvement which comprises continuously introducing said ethylene, hydrocarbon, and catalyst into said reaction zone at predetermined rates; circulating a coolant at a constant rate in indirect heat exchange with reaction mixture in said reaction zone, said coolant being at about its boiling point and at a substantially constant pressure, so as to maintain a predetermined temperature in said reaction zone; recovering an effluent stream containing polymer product from said reaction zone; withdrawing a coolant stream comprising liquid and vaporous coolant from said reaction zone; separating coolant vapors from said coolant stream; measuring the flow rate of coolant vapors separated from said coolant stream; increasing the rate at which ethylene is introduced into said reaction zone when said flow rate of coolant vapors is less than a predetermined value; and decreasing the rate at which ethylene is introduced into said reaction zone when said flow rate of coolant vapors is greater than a predetermined value.

10. In combination with a polymerization reactor system comprising a reaction vessel, means for introducing catalyst into said reaction vessel, means for introducing solvent to said reaction vessel, means for introducing a reactant into said reaction vessel, and an indirect heat exchange coil positioned in said reaction vessel, the improvement which comprises, in combination: a phase separator in communication with the outlet end of said coil and with the inlet end of said coil; a vapor withdrawal conduit in communication with said phase separator; a motor valve in said vapor withdrawal conduit; a pressure controller adapted to adjust said motor valve in response to pressure in said phase separator; an orifice connected in said vapor withdrawal conduit between said phase separator and said motor valve; and a rate-of-flow controller responsive to the rate of flow through said orifice and adapted to control the rate of flow through one of said means for introducing catalyst and said means for introducing reactant.

References Cited in the file of this patent

UNITED STATES PATENTS

| | | |
|---|---|---|
| 1,440,926 | Macdonald | Jan. 2, 1923 |
| 2,160,408 | Ballentine | May 30, 1939 |
| 2,497,828 | Young | Feb. 14, 1950 |
| 2,684,326 | Boyd | July 20, 1954 |
| 2,692,258 | Roebuck et al. | Oct. 19, 1954 |
| 2,714,101 | Amos et al. | July 26, 1955 |
| 2,808,234 | Rosenblad | Oct. 1, 1957 |
| 2,820,779 | Dale | Jan. 21, 1958 |